United States Patent [19]
Markling

[11] Patent Number: 5,368,371
[45] Date of Patent: Nov. 29, 1994

[54] MOLDED WHEEL WITH INTEGRAL AXLE RETAINER

[75] Inventor: Tracy A. Markling, Delavan, Wis.

[73] Assignee: Poly-Flex, Inc., Walworth, Wis.

[21] Appl. No.: 80,366

[22] Filed: Jun. 21, 1993

[51] Int. Cl.$^5$ .............................................. B60B 5/02
[52] U.S. Cl. .......................... 301/64.7; 301/105.1; 301/111
[58] Field of Search ............ 301/37.22, 43, 64.7, 301/111, 112, 118, 119, 121; 152/323

[56] References Cited

U.S. PATENT DOCUMENTS

| | | | |
|---|---|---|---|
| 2,615,759 | 10/1952 | Becker | 301/112 |
| 2,778,159 | 1/1957 | Irwin | 301/64.7 X |
| 3,048,447 | 8/1962 | Klint | 152/323 X |
| 3,128,815 | 4/1964 | Nonnamaker | 301/37.22 X |
| 3,360,300 | 12/1967 | Carter | 301/64.7 |
| 3,672,743 | 6/1972 | Pompey | 301/112 |
| 5,104,200 | 4/1992 | Prout et al. | 301/64.3 |
| 5,277,480 | 1/1994 | Chiu | 301/111 |

*Primary Examiner*—Russell D. Stormer
*Attorney, Agent, or Firm*—Douglas L. Tschida

[57] ABSTRACT

A molded plastic wheel having an integrally formed axle retainer which mates to an annular axle groove. In a blow molded wheel construction, a number of flexible tabs radially project into an axle bore. A portion of each tab is acutely displaced to the bore walls adjacent to a region of relief which facilitates tab flexion. The tabs are die cut from flashed material at the bore. Internal trusses formed intermediate external traction lugs at the tread to sidewall transition stabilize the wheel rim.

12 Claims, 9 Drawing Sheets

MOLDED WHEEL WITH INTEGRAL AXLE RETAINER

BACKGROUND OF THE INVENTION

The present invention relates to molded plastic wheels and, in particular, to a light duty utility wheel such as used with trash containers, barbecues, lawn mowers, utility carts, etc.

A variety of utility wheels have been developed over the years for numerous light and medium duty applications. Inherent to the structural rigidity and durability of any wheel is the necessity of a secure attachment between the wheel and a supporting axle. Depending upon the loading and application, varieties of attachment mechanisms can be employed to retain the wheel to the axle. The simplicity or complexity of the attachment mechanism can affect the overall apparatus cost.

Utility wheels of the present type are commonly mounted to a supporting axle with the benefit of a spring biased pin. For many wheels, it has been necessary to insert mold or stake mount one or more pin containing retainers into the wheel, such that with subsequent mounting of the wheel, a spring biased pin is captured within an axle groove. Examples of spring biased pin retainer assemblies can be seen at U.S. Pat. Nos. 277,425; 390,465; 575,649; and 2,568,834.

End cap retainers, commonly referred to as pal nuts, having flexible fingers are also known and can be mounted over the exposed end of an axle to prevent wheel release. The fingers of a cap piece typically flex to frictionally engage the axle or a groove formed into the axle, for example, see U.S. Pat. No. 2,615,759.

A cotter pin and one or more washers may also be mounted to the axle to retain the wheel to the axle.

U.S. Pat. Nos. 4,544,425 and 5,143,427 disclose bushings which can be separately mounted between a wheel and axle to provide a bearing surface and secure the wheel to the axle. The former patent includes a bushing containing a number of flexible fingers which mount into annular recesses at the axle. The latter patent discloses a bushing having end pieces which expand upon the insertion of the axle to simultaneously grip the axle and expand to grip a mating wheel surface.

Nowhere are wheels known having integrally formed members that flex to mate with the axle to retain the axle to the wheel.

In appreciation of the foregoing deficiencies, the presently improved wheel was developed to convert a normal molding inconvenience into a wheel of improved construction. The improved wheel securely mounts to available axles to provide a durable attachment with reduced assembly time and without component complexity.

The stability and loading characteristics of the wheel are also enhanced through a number of internal trusses that span the tread to sidewall transition. The trusses are formed intermediate external traction lugs that project from the tread surface.

SUMMARY OF THE INVENTION

It is accordingly a primary object of the invention to provide a molded plastic wheel including an integral axle retainer.

It is a further object of the invention to provide a multi-leaflet or multi-tabbed retainer wherein a number of tabs radially and integrally project from the walls of an axle bore.

It is a further object of the invention to provide an axle bore which includes a region of relief adjacent to the normal direction of tab flexion.

It is a further object of the invention to provide an axle retainer which is die cut from waste flashing material within the axle bore of a blow molded wheel.

It is a further object of the invention to provide tabs which acutely project from the bore walls along a longitudinal axis of the bore in a preferred direction to a supporting axle.

It is a further object to provide a number of integral trusses at the tread to sidewall transition to stabilize the rim or "box" region of the wheel.

It is a still further object of the invention to mold trusses of which protrude from the nominal sidewall surface within the box interior, intermediate external traction lugs at the tread surface.

Various of the foregoing objects, advantages and distinctions of the invention are described with respect to a presently preferred blow molded wheel construction. The wheel includes hollow hub, spoke and rim regions. A bore of the hub includes a number of tabs which integrally and acutely project from bore walls. A region of annular relief is formed adjacent the tabs and receives the tabs upon flexure with the insertion of an axle.

A number of lugs are formed into a tread surface and are separated by a number of recesses. Internal trusses are formed into the rim and exhibit a right triangular shape at a sidewall to tread surface transition.

Still other objects, advantages and distinctions of the invention will become more apparent upon reference to the following detailed description with respect to the appended drawings. To the extent various modifications and improvements have been considered, they are described as appropriate. The invention should not however be interpreted in strict limitation to the provided description. Rather, the invention should be interpreted within the spirit and scope of the appended claims.

DESCRIPTION OF THE PREFERRED EMBODIMENT

Figure 1:
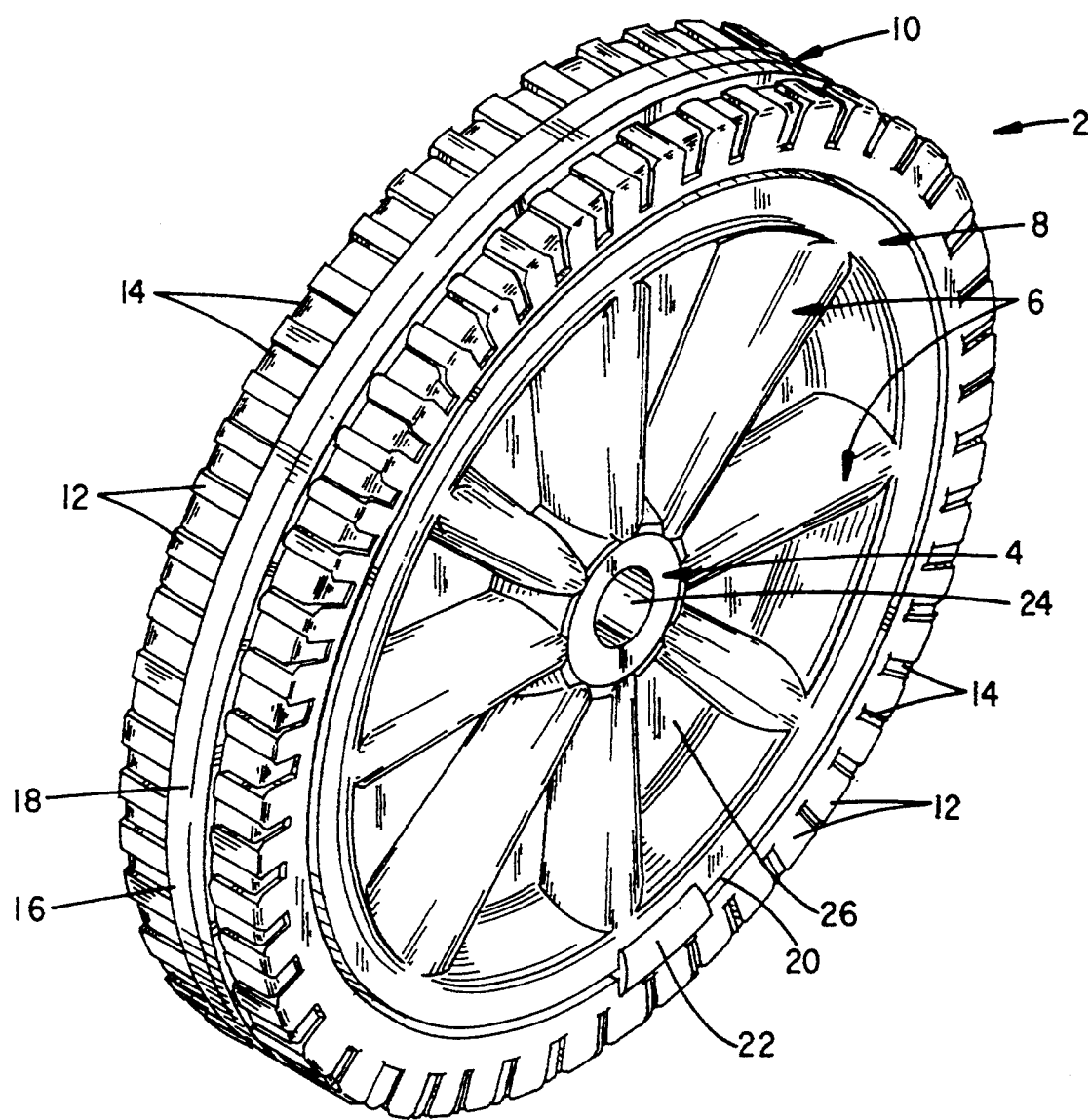
FIG. 1 is a perspective drawing of a blow molded wheel of improved construction.

Referring to FIG. 1, a perspective drawing is shown of a molded plastic wheel 2 which is constructed to include the improvements of the invention. The improvements include integrally molded axle retainer tabs and tread to sidewall stabilizer trusses.

The wheel comprises a central hub region 4 and from which hub radiate a number of spokes 6. The spokes 6 extend to a concentric rim or "box" region 8. The circumferential surface 10 of the rim 8 defines a tread or rolling support surface of the wheel 2. A number of projecting traction lugs 12 are formed into the tread surface 10. The lugs 12 project above intervening recessed surfaces 14. The lugs 12 radially extend from the sidewall of the rim 8 and over to the plane of the tread surface 10, where the lugs 12 are redirected to extend inward toward a center annular band 16. The band 16 includes a parting line 18 which occurs from the molding process where a pair of molding cavities (not shown) mate with one another. A resulting flashing is removed from the parting line during the fabrication of the wheel.

The lugs 12 facilitate traction over soft ground surfaces and stabilize the rim at the tread to sidewall transition. Alternating internal trusses 60 formed at the regions of the recesses 14 further stabilize the rim 8 and are discussed in detail at FIGS. 8 and 9.

An annular groove 20 extends about the sidewall of the rim 8. Depending upon the wheel construction, a decorative white wall member 22, which is shown in partial cutaway detail, can be insert molded to the wheel or be separately attached to the groove 20 to provide surface ornamentation.

A bore 24 includes an integrally formed axle retainer, which is discussed in greater detail with respect to FIGS. 2 through 6. The wheel 2 is normally mounted to an axle which is inserted into the bore 24.

The wheel 2 as presently constructed is formed via a blow molding process and is molded from a high density polyethylene (HDPE) material. Accordingly, the wheel 2 includes a number of hollow cavities which communicate with one another. FIG. 3, which is taken along section lines 3—3 of the front elevation view of FIG. 2, particularly discloses more of the details of the hollow cavities 28, 30 and 32, which respectively occur at the regions of the rim 8, spokes 6 and hub 4.

Integral, solid web pieces 26 extend between the spokes 6 and rim 8. Added stability at the rim to hub transition region is obtained with the webs 26, which stability becomes significant for larger diameter wheels in the range of 10 to 12 inches. As presently constructed, the webs 26 present a thickness substantially of the same as the walls of the wheel, although a cavity space could be provided in the region of the webs 26.

Internal trusses 60 are also formed at the recesses 14 and add to the stability and structural strength of the wheel 2. The trusses 60 are shown at the lower cavity space 28 of FIG. 3 and are described in greater detail with respect to FIGS. 8 and 9 below.

Figure 2:
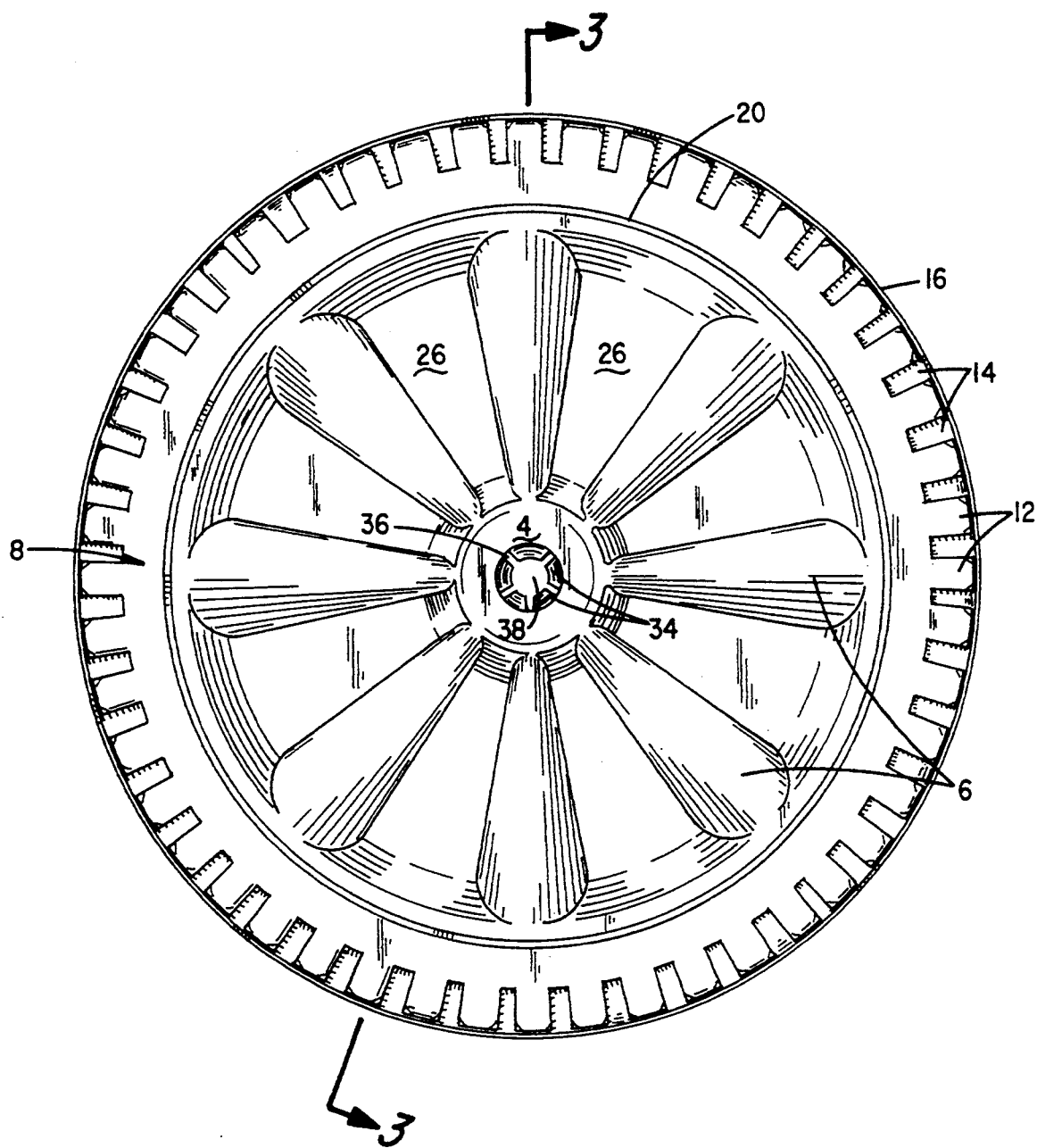
FIG. 2 is a front elevation drawing of the wheel of FIG. 1.
Figure 3:
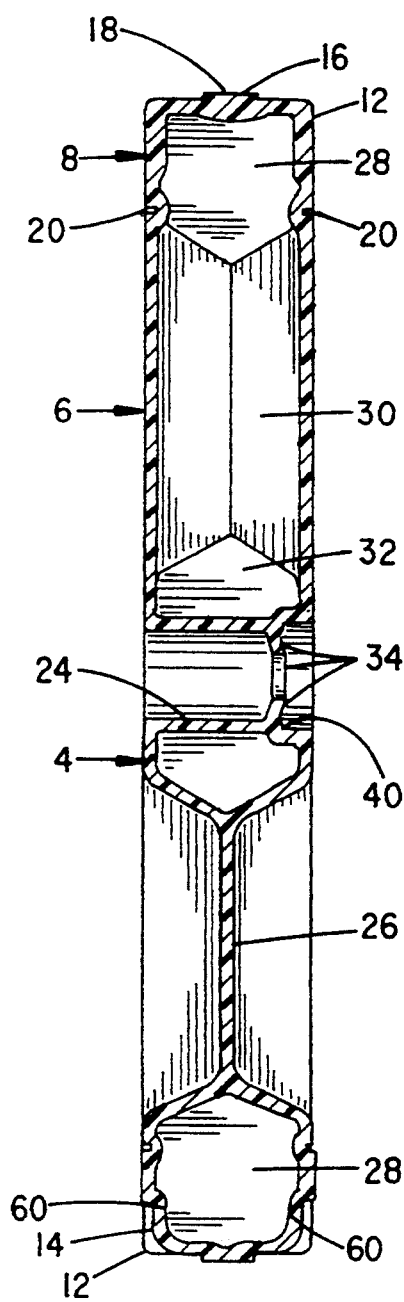
FIG. 3 is a cross section drawing taken along section lines 3—3 of FIG. 2 depicting section views through spoke and web regions of the wheel.

Turning attention to FIGS. 2 and 3, the bore 24 is constructed to include a number of leaflets or tabs 34 which radially project into the bore 24. Each leaflet is separated from an adjoining leaflet by a gap 36. A void 38 is provided at the center of the leaflets 34. The gaps 36 and void 38 permit the tabs 34 to flex with the insertion of an axle into the bore 24.

Tab flexion is facilitated by an annular relief 40 which is formed into the bore 24 adjacent the normal direction of flexion of the tabs 34. That is, the diameter of the bore 24 is slightly increased at a space adjacent to the tabs 34 to permit the tabs 34 to bend into the relief 40 as an axle is inserted. For a typical bore diameter of 0.870 inches and a tab thickness of 0.100 inches, a relief diameter of 1.070 inches is provided.

Figure 4:
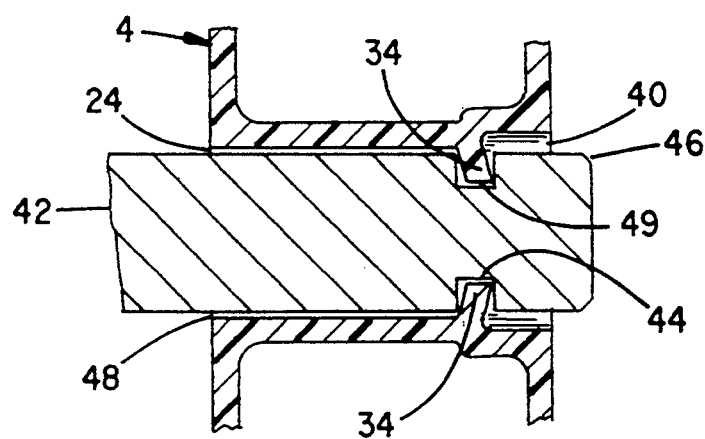
FIG. 4 is cross-section drawing showing an axle inserted into an axle bore containing the improved retainer.

A detailed cross section view of the mounting relationship of an axle 42 to the bore 24 is shown at FIG. 4. The axle 42 is typically constructed of a metal rod stock to a suitable length. An annular groove 44 is cut into the axle 42. A chamfered edge 46 may also be formed into the axle 42. Upon inserting the axle 42 into the bore 24, the tabs 34 flex into the relief space 40 as the axle 42 passes. As the groove 44 aligns with the tabs 34, the tabs 34 flex back to their normal position to retain the axle 42 to the wheel 2. The thickness of the tabs 34 may vary but are presently constructed to substantially correspond to the nominal wall thickness of the wheel 2.

The groove 44 is constructed to a corresponding dimension to the tabs 34. Under the normally intended loading and light duty utility use to which the wheel 2 is normally subjected, the tabs 34 provide sufficient holding characteristics to retain the wheel 2 to the axle 42.

The bore 24 is sized to provide a diameter slightly in excess of that of the axle 42 and provide a gap 48 which surrounds the axle of approximately 0.010 inches. The dimension of the gap 48 is selected to accommodate molding tolerances, the wheel mounting operation and later rotation of the wheel 2 without promoting undue wear along the bore 24. Close bore tolerances and spacings also facilitate the long term retention of the axle to the wheel as the end surfaces 49 of the tabs 34 wear, should the surfaces 49 contact the axle 42. Preferably a permanent wheel mount is obtained, although it is possible to adjust dimensions to permit detachment of the wheel 2.

Figure 5:
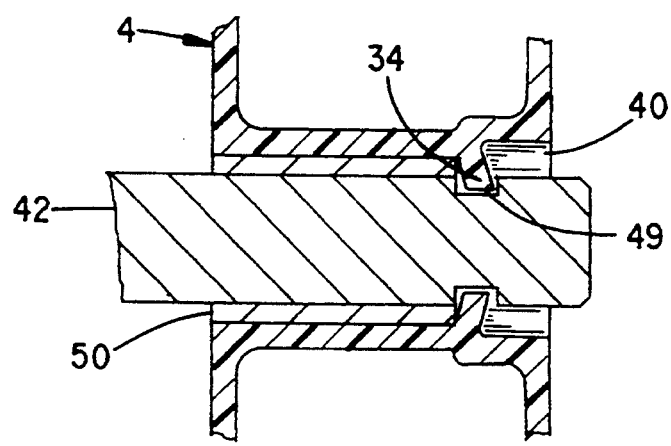
FIG. 5 is cross-section drawing showing an axle inserted into an axle bore containing the improved retainer and a bushing insert.

FIG. 5 depicts a cross section view through a wheel which contains an axle bushing 50. The bushing 50 can be added with the axle 42 or can be separately molded into the wheel in the fashion of a mold insert, such as the whitewall 22. The material of the bushing 50 is typically selected to exhibit a durometer greater than that of the wheel 2 to minimize wear over time.

Figure 7:
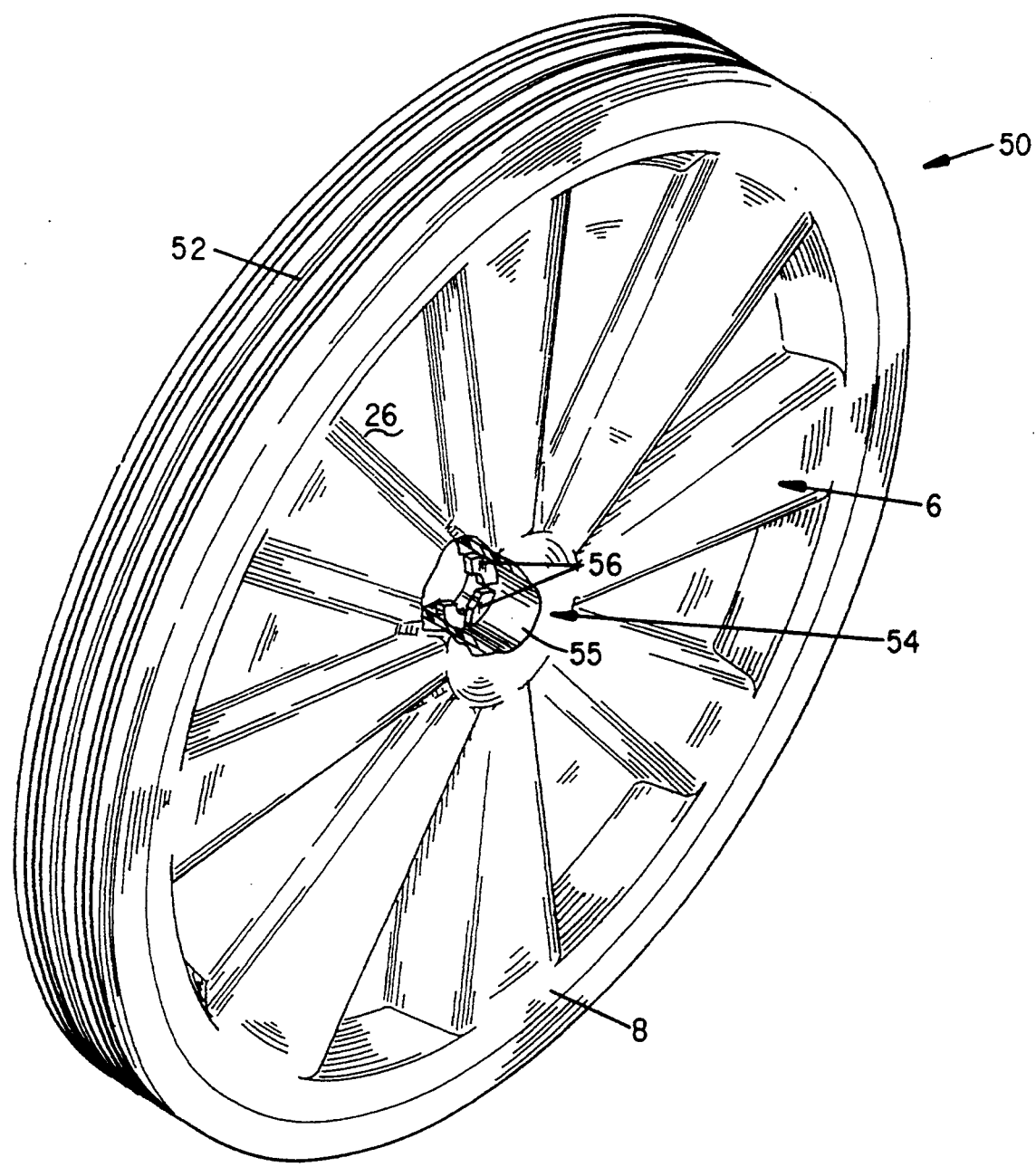
FIG. 7 is a perspective drawing of a compositional wheel including the invention, which is shown in partial cutaway.

FIG. 7 depicts a wheel 50 of composite construction similar to that disclosed in co-pending application, Ser. No. 07/875,676, filed Apr. 29, 1992, now U.S. Pat. No. 5,316,377 and also assigned to the present assignee Poly-Flex, Inc. . The wheel 50 includes a flow-bonded tread surface 52 having a different durometer than that of the wheel body. The wheel 50 has been further improved to include a number of retainer tabs 56, which can be seen at the cutaway portion of the hub 54 and axle bore 55. The tabs 56 radially project from the bore walls into the bore 55 to mate with an inserted axle in the fashion of FIGS. 4 and 5.

Returning attention to FIG. 3, it is to be appreciated the tabs 34 are shaped to project at a preferred angular orientation to the walls of the bore 24. In particular, each of the tabs 34 project at an acute angle from the bore walls. Each tab 34 is tipped in a direction compatible to the direction at which the axle 42 is inserted. Presently, an acute angle is formed between each tab 34 and the bore walls in the range of 50 to 70 degrees. The slight tipping of the tabs 34 facilitates axle insertion. The tipping also increases the apparent thickness of the tabs 34 to reduce the potential for shear and release of the wheel. Alternatively, the tabs 34 can be formed to orthogonally project from the bore walls or may even be directed at an obtuse angle counter to the direction of axle insertion. The bore relief region 40 receives the tabs 34 as they flex with axle insertion.

Figure 6:
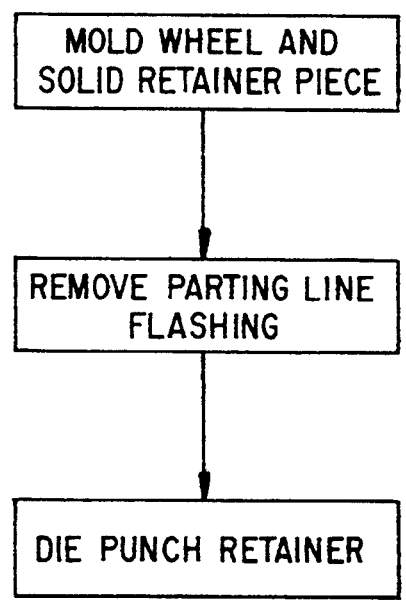
FIG. 6 is a flow diagram of the method for constructing the improved wheel of the invention.

With further attention to the flow diagram of FIG. 6, a solid bore filler piece of tailored thickness is formed which spans the bore 24. The thickness of the material may be varied depending upon the wheel and application. In a typical prior art molding operation, waste flashing occurred in the axle bore. The waste was removed by inserting a circular die member of a diameter comparable to the bore 24 to cut away the entire flashing piece as part of the finishing of the wheel. The flashing which occurred at the parting line 18 having been previously removed.

Instead of completely removing the presently molded filler piece, the present molding process only selectively removes portions of the specifically molded material to form the axle retainer tabs 34. In lieu of a circular die, a forming die is inserted at the enlarged relief region 40 which causes the forming of the depicted tabs 34, gaps 36 and void 38. The thickness, numbers, configuration and arrangements of tabs 34 can be adjusted as desired. Preferably, the number of tabs 34 is kept to a minimum, while meeting the further considerations that the tabs be able to sufficiently flex to accommodate axle insertion, yet return to original shape and provide sufficient axle retention without subsequent release. Five tabs 34 are presently provided, although more or less tabs 34 could be formed. The thickness of the tabs 34 are also molded to be uniform throughout each of the tabs 34. The thickness of one or more tabs, however, might be adjusted with the initial molding of the filler piece.

Figure 8:
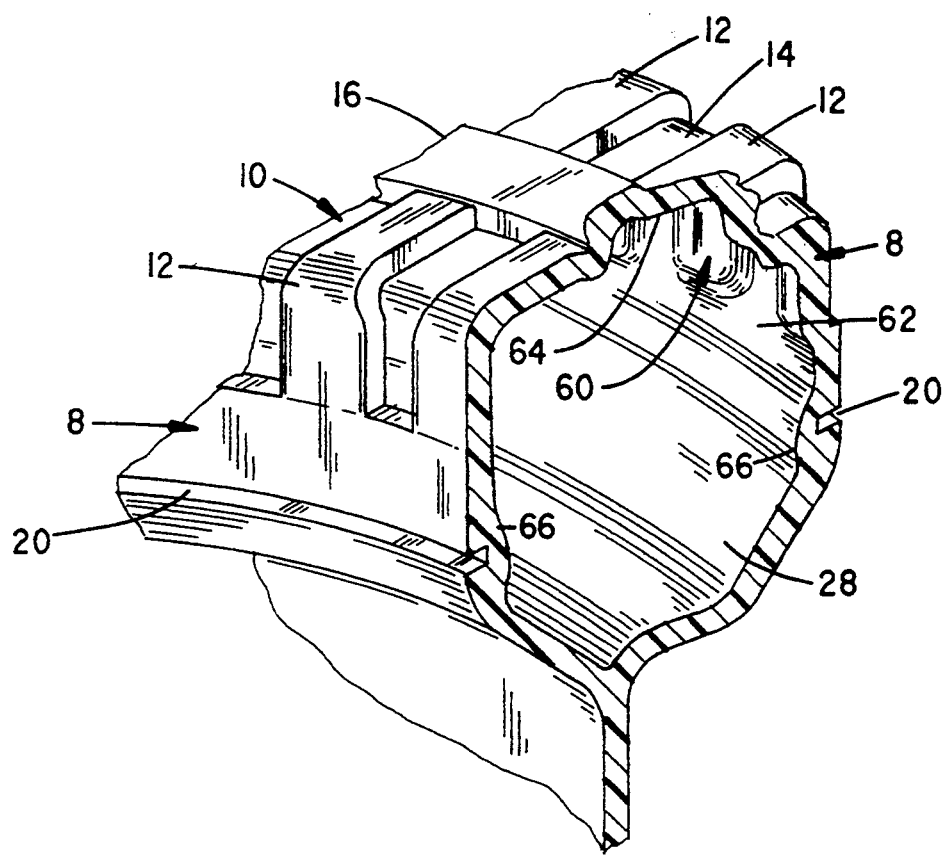
FIG. 8 is a perspective drawing of the stabilizing trusses which are formed into the walls at the rim to tread transition.
Figure 9:
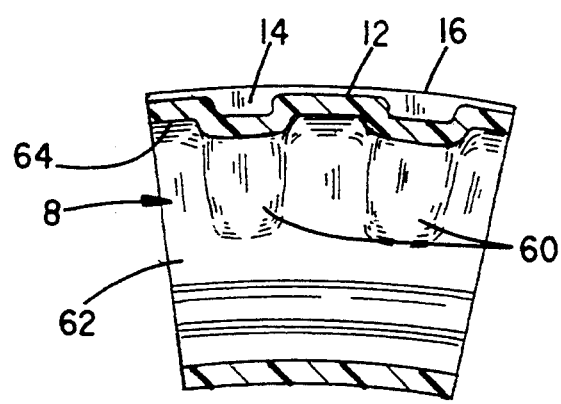
FIG. 9 is a partial sectional elevation drawing through the plane of the wheel depicting the relationship of the trusses to the lugs.

Turning attention lastly to FIGS. 8 and 9, detailed views are shown to the interior surface of the rim or "box" region 28 of the wheel 2 and a number of reinforcement or stabilizing trusses 60 which are formed into the wheel 2 to structurally enhance the sidewall and tread wall strength of the wheel 2. Each truss 60 is integrally formed to project from the interior sidewall surface 62 and interior tread surface 64 to form a right angled, triangular or L-shaped support beneath each recess 14.

The L-shape of the truss stabilizes the transition between the rim and tread regions 8 and 10 against lateral flexion with loading. That is, the stability of the wheel is improved and the wheel 2 is able to withstand greater loads without undue lateral flexion or compression.

The trusses 60 result from the relatively sharp edges which occur in the molds at the regions where the lugs 12 are formed. The degree of protrusion of each truss 60 at the rim interior can be affected by the spacing between the lugs 12. That is, the closer the spacing, the greater the protrusion. As the material is expanded within the mold, the mold edges at the lugs 12 particularly induces the HDPE material to form the protuberances which define the trusses 60. In a similar fashion a protuberance 66 occurs on the interior sidewall surfaces 62 opposite the grooves 20. In contrast to the grooves 20, the trusses 60 are tailored to a preferred shape and thickness to stabilize the wheel 2.

While the invention has been described with respect to its presently preferred embodiment and alternatively considered modifications and improvements thereto, still other constructions may suggest themselves to those skilled in the art. The following claims should therefore be interpreted to include all those equivalent embodiments within the spirit and scope thereof.

What is claimed is:

1. A molded plastic wheel comprising, an annular hub having a bore, a plurality of spokes, and a rim having a wheel support surface, wherein said spokes radially extend between said rim and hub, wherein said bore includes first and second regions or differing diameters, and wherein said bore includes a plurality of integral tabs which protect from the walls of said bore intermediate the first and second regions and which tabs are formed to flex along a longitudinal axis of the bore, whereby said tabs are capable of restraining an axle to said wheel.

2. A wheel as set forth in claim 1 wherein said tabs project at an acute angle from the walls of said bore.

3. A wheel as set forth in claim 2 wherein said tabs project at an acute angle in the range of 50 to 70 from the walls of said bore.

4. A wheel as set forth in claim 3 wherein said tabs exhibit a thickness in the range of 0.100 to 0.150 inches.

5. A wheel as set forth in claim 1 wherein said plurality of tabs are spaced apart from one another and provide an unobstructed aperture at the center of said bore.

6. A wheel as set forth in claim 1 wherein said rim includes a plurality of lugs which project from a sidewall region of said rim and said support surface.

7. A wheel as set forth in claim 6 wherein said rim includes a plurality of recesses intermediate said lugs and wherein each of said recesses includes a surface internal to said wheel of which protrudes from a nominal interior wall surface.

8. A wheel as set forth in claim 1 wherein said tabs project at an acute angle from the walls of said bore in the direction of the one of said first and second regions of greatest diameter.

9. A wheel as set forth in claim 1 wherein said plurality of tabs are spaced apart from one another and provide an unobstructed aperture at the center of said bore.

10. A blow molded plastic wheel comprising, a hollow annular hub having a bore containing a first region of a first diameter and a second region of a second diameter greater than the first diameter, a plurality of hollow spokes, a plurality of webs which integrally extend between adjacent ones of said plurality of spokes, and a hollow rim having a wheel support surface, wherein said spokes and webs radially extend between said rim and hub, wherein said bore includes a plurality of integral tabs which radially project at an acute angle to the bore walls from said first region into said second region, such that said tabs can flex and bend into the second region.

11. A wheel as set forth in claim 10 wherein said tabs project at an acute angle in the range of 50 to 70 from the walls of said bore and exhibit a thickness in the range of 0.100 to 0.150 inches.

12. A blow molded plastic wheel comprising, a hollow annular hub having a bore and a hollow rim integrally molded with said hub having a wheel support surface, wherein said bore includes first and second regions or differing diameters, and wherein said bore includes a plurality of integral tabs which radially project from the bore walls into said bore intermediate the first and second regions.

* * * * *